United States Patent [19]

Fitzgerald

[11] 4,298,398

[45] Nov. 3, 1981

[54] PROCESS FOR CONVERTING PREMILLED CRUDE QUINACRIDONE TO PIGMENTARY FORM

[75] Inventor: Patrick H. Fitzgerald, Pitman, N.J.

[73] Assignee: E. I. Du Pont de Nemours and Company, Wilmington, Del.

[21] Appl. No.: 181,958

[22] Filed: Aug. 28, 1980

[51] Int. Cl.$^3$ .............................................. C09B 48/00
[52] U.S. Cl. ........................... 106/288 Q; 106/308 N; 106/309
[58] Field of Search ............... 106/288 Q, 308 Q, 309, 106/308 N

[56] References Cited

U.S. PATENT DOCUMENTS

| | | | |
|---|---|---|---|
| 2,857,400 | 10/1958 | Cooper | 260/246 |
| 3,017,414 | 1/1962 | Minnich | 260/279 |
| 3,287,147 | 11/1966 | Wilkinson | 106/288 |
| 3,754,958 | 8/1973 | Giardbalvo | 106/288 Q |
| 4,094,699 | 6/1978 | Fitzgerald | 106/288 Q |

Primary Examiner—Carl F. Dees

[57] ABSTRACT

Process for converting premilled quinacridone to pigmentary form by contacting the premilled quinacridone with aqueous alkaline medium in the presence of a quaternary ammonium compound.

6 Claims, No Drawings

PROCESS FOR CONVERTING PREMILLED CRUDE QUINACRIDONE TO PIGMENTARY FORM

BACKGROUND OF THE INVENTION

The invention relates to a process for converting premilled quinacridone to pigmentary form, and, more particularly, to a process involving contacting premilled quinacridone with an aqueous alkaline medium in the absence of organic liquids.

It is well known in the art that quinacridones direct from synthesis, known as crude quinacridones, are unsuitable for use as pigments and must be further processed to develop appropriate pigmentary properties, e.g., particle size, strength, phase, etc. The most commonly used processes for converting crude quinacridone to pigmentary form involve milling the crude quinacridone with large quantities of inorganic salt, then acid extracting the resulting quinacridone pigment. While the salt-grinding process can produce satisfactory pigment, the total volume of the grinding elements and salt is so large that only a relatively small amount of pigment can be milled for each batch. Furthermore, disposal of the large amounts of salt solution which results from the extraction step creates potential pollution problems and adds considerably to the manufacturing costs.

Attempts to eliminate the use of salt in premilling crude quinacridone, as described, for example, in U.S. Pat. No. 2,857,400 and U.S. Pat. No. 3,017,414, involve milling crude quinacridone without salt and contacting the milled quinacridone with an organic liquid or an acidic aqueous slurry of organic liquid. The organic liquid is removed from the slurry and the resulting quinacridone pigment is isolated in the conventional manner. The amounts of organic liquid utilized in these processes are generally at least 30% by weight, based on the weight of the quinacridone being processed and, like the salt, can create expensive waste disposal problems.

Another method for preparing pigmentary quinacridone from crude quinacridone, as described in U.S. Pat. No. 3,287,147, involves heating a neutral aqueous paste of quinacridones under pressure at between 150° C. and 300° C. The quinacridones so treated can result from salt milling crude quinacridones or from acid pasting crude quinacridones. In either case special equipment is necessary to withstand the high temperatures and pressures required.

More recently, another method for preparing pigmentary quinacridone from crude quinacridone, as described in U.S. Pat. No. 4,094,699, involved contacting premilled crude quinacridone with an aqueous alkaline medium in the presence of at least one surfactant. While this process is generally satisfactory, some residual surfactant is retained on the pigment which can have an adverse effect on some end use systems. For instance they can cause undesirably high viscosity in some automotive paint systems and reduce the stability of vinyl plastics.

SUMMARY OF THE INVENTION

In accordance with the present invention there is provided a process for converting premilled crude quinacridone to pigmentary form by contacting the premilled crude quinacridone with an aqueous alkaline medium, preferably having a pH of at least 10, at a temperature of at least 85° C. in the presence of certain quaternary ammonium compounds.

DETAILED DESCRIPTION

For the practice of this invention the term "premilled" quinacridone is intended to include crude quinacridone which has been dry milled with inert grinding elements, such as rods, balls, etc., with or without grinding aids such as salt, and optionally surfactant. The conditions applicable to the premilling operation are well-known in the art. For example, in the case preferred for the practice of the invention where no salt is used, the mill loading is substantially conventional for ball milling operations. The charge of grinding elements usually occupies about half of the volume of the mill and the crude quinacridone to be milled occupies considerably more than the voids between these elements so that the total charge in the mill is in the range of 60 to 65% of the total volume of the mill. Grinding elements most commonly used include steel rods, balls and nails. The milling time will vary depending upon the particular quinacridone being milled, the mill loading, and the type of mill being used. A minimum of 4 to 6 hours is usually required, and this may be extended to as much as 30 to 40 hours.

The term "quinacridone" as used herein is intended to include unsubstituted and substituted quinacridones, and mixtures and solid solutions thereof, of the type described, for example, in U.S. Pat. No. 2,844,484, U.S. Pat. No. 2,844,485, U.S. Pat. No. 2,821,530, U.S. Pat. No. 2,844,581 and U.S. Pat. No. 3,160,510.

The premilled quinacridone is contacted with an aqueous alkaline medium, containing certain cationic phase transfer catalysts, which in the present invention are acting as crystal growth agents. The contact can be accomplished in any convenient manner. For example, the premilled quinacridone can be added to the aqueous alkaline medium with stirring. The amount of aqueous alkaline medium used to contact the premilled quinacridone should be sufficient to intimately contact all the quinacridone. In general the weight of the aqueous alkaline medium should preferably be at least 4 times the weight of the premilled quinacridone to insure complete intimate contact.

To insure conversion of the premilled quinacridone to pigmentary form, the pH of the aqueous alkaline medium should be at least 10, and preferably from 11.5 to 14.0. For unsubstituted premilled quinacridone a pH from 11 to about 12.5 is preferred. For highly substituted quinacridone, mixtures and solid solutions of quinacridones a pH from 12.5 to 14 is preferred. For quinacridones generally, a pH from 12 to 13.5 is most preferred.

The required alkalinity can be achieved by adding a base, which does not react with the quinacridone, to water. Sodium hydroxide is preferred for reasons of economics and disposability. In general an aqueous medium containing from 0.5% to 5% by weight of base, calculated as sodium hydroxide and based on the total weight of the aqueous medium has the requisite alkalinity. However, higher concentrations of base may be necessary if acid salts such as aluminum sulfate are present in the milled powder.

In addition to the requisite alkalinity at least one quaternary ammonium compound should be present. The quaternary ammonium compounds useful in the present invention have the formula $(n\text{-}C_4H_9)_3R\text{-}N^+\ X^-$ where R- is —CH$_3$n-C$_4$H$_9$, —CH$_2$C$_6$H$_5$, —C$_2$H$_5$, or n-C$_3$H$_7$, and X$^-$ is Cl$^-$, Br$^-$, I$^-$,

OH$^-$ or NO$_3^-$. These quaternary ammonium compounds generally are used as cationic phase transfer catalysts. In the present invention the quaternary ammonium compounds are acting as crystal growth agents for converting premilled crude quinacridone into pigmentary quinacridone. It is preferred that the quaternary ammonium compound be used in an amount of from 2 to 15% by weight and more preferably from 5 to 10% by weight, based on the weight of the premilled crude quinacridone. These quaternary ammonium compounds have sufficient oleophilicity to afford crystal growth, but are easily washed from the pigment during normal washing operations. Thus, as compared with using a surfactant, a cleaner pigment surface is obtained and there are less opportunities for undesirable interactions in various end use applications.

The quaternary ammonium compounds can be added to the aqueous alkaline medium prior to contacting the premilled crude quinacridone or can be present during the premilling of crude quinacridone so that they enter the aqueous alkaline medium with the premilled quinacridone. The critical feature is that at least one quaternary ammonium compound be prsent during the contacting step, in the amounts and of the types specified above.

After contacting the premilled quinacridone with the aqueous alkaline medium, the temperature of the resulting slurry should be at least 85° C., and preferably from 90° C. to 97° C. The aqueous alkaline medium can be heated prior to contact, if desired, to decrease or eliminate heat-up time after contact with the premilled quinacridone. Higher temperatures are unnecessary, and boiling the slurry should be avoided for reasons of safety. The duration of contact at temperature can vary depending upon the particular premilled quinacridone being treated, but usually ranges from 30 minutes to 10 hours, and preferably from one to two hours.

After completion of the contact with the aqueous alkaline medium, the quinacridone can be isolated or further processed in the conventional manner. Since the premilled quinacridone is commonly milled using iron or steel grinding elements, iron filings are usually present in the premilled quinacridone. Consequently to remove the iron filings the alkaline slurry should be acidified prior to isolation or further processing of the pigment. The common practice involves adding sufficient acid to provide from 0.5 to 2% by weight of acid, calculated as sulfuric acid and based on the weight of aqueous alkaline medium. The acidified slurry is preferably held at a temperature of at least 85° C. for 30 minutes to two hours to insure dissolution of any iron which may be present.

The quinacridone pigment prepared according to the invention can be subjected to a variety of treatments, depending on the end use and specific properties desired. For example, as described in U.S. Pat. No. 3,386,843, the quinacridone pigment can be contacted with quinacridone monosulfonic acid while still in slurry form, after which a metal salt is added to the slurry to form a composition containing the quinacridone pigment and the metal salt of quinacridone sulfonic acid. Another treatment, commonly used to increase transparency in paints, involves mixing the quinacridone in aqueous slurry with a small quantity of antiflocculating agent.

The quinacridone pigment can conveniently be recovered from the slurry by filtration, washing, and drying. The quinacridone pigment can be used without further processing or, if desired, can be pulverized, with or without extender pigments, such as nickel carbonate, prior to use.

The quinacridone pigment prepared in accordance with the invention exhibits pigmentary properties which are at least equal to quinacridone pigment prepared by conventional high salt milling or with organic liquids, without the high cost and pollution problems associated with conventional processes.

The following examples illustrate the invention.

EXAMPLES

EXAMPLE 1

To a solution of 3 parts tetrabutylammonium bromide and 2 parts Igepal CO-210 a polyethoxynonylphenol in 270 parts water is added 55 parts of a mill powder which had been prepared by dry grinding 42 parts crude 4,11-dichloroquinacridone and 58 parts crude α-quinacridone with 10 parts Al$_2$(SO$_4$)$_3$. 18H$_2$O for 19 hours in a ball mill. After stirring the slurry for a few minutes 52 parts of 30% NaOH solution is added and the slurry is heated to 92° to 95° C. and stirred at that temperature for 3¼ hours. The slurry is then cooled to 85° C. and acidified with 53 parts of 21% sulfuric acid. The slurry is then stirred for 1½ hours at 88° to 92° C. and then the product is filtered, washed and dried.

The product is a yellow shade red solid solution which shows improved heat stability in soft vinyl plastic over similar product made with long-chain quaternary surfactants as taught in U.S. Pat. No. 4,096,699.

EXAMPLE 2

To a solution of 5.25 parts of tetrabutylammonium bromide and 2.25 parts of Igepal CO-990 a polyethoxynonylphenol in 250 parts water is added 90 parts of a mill powder which has been prepared by dry grinding 75 parts of crude 2,9-dichloroquinacridone, 25 parts of crude γ-quinacridone and 20 parts of Al$_2$(SO$_4$)$_3$.18H$_2$O for 26 hours. After stirring to wet the powder, 195 parts of 30% NaOH solution is added and the slurry heated. The slurry is stirred at 92° to 94° C. for 3½ hours and then cooled to 85° C. Then the slurry is acidified with 190 parts of 21% sulfuric acid and stirred 1½ hours at 88° to 92° C. for 1¼ hours. The slurry is then treated with quinacridone sulfonic acid and the pigment isolated in the usual manner. The product is an intense magenta solid solution pigment which functions well in dispersion lacquer. Extraction of the product with organic solvents shows that no tetrabutylammonium bromide is retained on the surface after normal water washing.

EXAMPLE 3

Example 2 is repeated except that 5.25 parts of benzyltributylammonium chloride is substituted for 5.25 parts of tetrabutylammonium bromide. The product is an intense magenta solid solution pigment which functions well in dispersion lacquer.

EXAMPLE 4

Example 2 is repeated except that 24.5 parts of a 1.0 M solution of methyltributylammonium hydroxide is substituted for the 5.25 parts of tetrabutylammonium bromide. The product is an intense magenta solid solution pigment which functions well in dispersion lacquer.

EXAMPLE 5

Example 2 is repeated except that 7 parts of Arquad 2C-75, 75% dicocodimethylammonium chloride solution is substituted for 5.25 parts of tetrabutylammonium bromide. The product is an intense magenta solid solution pigment. However, the product fails in dispersion lacquer due to a severe thixotropy problem related to retained cationic surfactant.

EXAMPLE 6

Example 2 is repeated except that 6.0 parts of Aliquat 336 (88% Active-Tricaprylyl methyl ammonium chloride) is substituted for 5.25 parts of tetrabutylammonium bromide.

The product is an intense magenta solid solution pigment, but, like that made in Example 5, it fails in dispersion lacquer due to severe thixotropy.

EXAMPLE 7

The product is made in the same manner as Example 2 except that 5.25 parts of benzyltriethylammonium chloride is substituted for 5.25 parts of tetrabutylammonium chloride.

The product is weak and dull compared to those in Examples 2 to 6, an indication of insufficient crystal growth.

EXAMPLE 8

To a solution of 3.5 parts of tetrabutylammonium bromide in 200 parts of water is added 50 parts of a mill powder made by dry grinding 100 parts of crude $\gamma$-quinacridone and 20 parts $Al_2(SO_4)_3 \cdot 18H_2O$ for 20 hours in a ball mill. The slurry is stirred to wet the powder and then 13 parts of 30% NaOH solution is added and the slurry heated to 90° C. The slurry is stirred 2 hours at 90° C. The product, isolated in a standard manner, is a dark masstone pigmentary $\gamma$-phase quinacridone red.

EXAMPLE 9

To a solution of 7 parts of benzyltributylammonium chloride in 200 ml of water is added 55 g of a mill powder made by dry grinding 100 parts of $\beta$-phase crude quinacridone with 10 parts of $Al_2(SO_4)_3 \cdot 18H_2O$ in a ball mill for 40 hours. To the slurry is added 65 parts of 30% NaOH solution and the slurry is heated to 90° to 93° C. and stirred at that temperature for 2 hours. The slurry is then acidified (to pH 1 to 2) and stirred at 90° C. for 2 hours. The product (filtered, washed and dried) is a violet pigment consisting of pigmentary $\beta$-phase quinacridone.

I claim:

1. A process for converting premilled crude quinacridone to pigmentary form by contacting the premilled quinacridone with an aqueous alkaline medium having a pH of at least 10 in an amount sufficient to intimately contact the premilled crude quinacridone at a temperature of at least 85° C. in the presence of at least one quaternary ammonium compound of the formula (n-$C_4H_9$)$_3$R-N$^+$ X$^-$ where R- is —$CH_3$n-$C_4H_9$, —$CH_2C_6H_5$, —$C_2H_5$, or n-$C_3H_7$ and X$^-$ is Cl$^-$, Br$^-$, I$^-$,

OH$^-$, or NO$_3^-$, wherein the quaternary ammonium compound is present in an amount of from 2 to 15% by weight, based on the weight of the premilled crude quinacridone.

2. The process of claim 1 wherein X$^-$ is Cl$^-$ or Br$^-$.
3. The process of claim 2 wherein the aqueous alkaline medium is present in at least 4 times the weight of the premilled crude quinacridone.
4. The process of claim 3 wherein the premilled quinacridone is contacted with the aqueous alkaline medium at ambient pressure.
5. The process of claim 4 wherein the pH of the aqueous alkaline medium is from 12 to 13.5.
6. The process of claim 5 wherein the quaternary ammonium compound is present in an amount of from 5 to 10% by weight, based on the weight of the premilled crude quinacridone.

* * * * *